US012126960B2

(12) United States Patent
Grigg et al.

(10) Patent No.: US 12,126,960 B2
(45) Date of Patent: Oct. 22, 2024

(54) PARYLENE ELECTRET CONDENSER MICROPHONE BACKPLATE

(71) Applicant: Shure Acquisition Holdings, Inc., Niles, IL (US)

(72) Inventors: Benjamin Jay Grigg, Chicago, IL (US); Donald D. Noettl, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/138,561

(22) Filed: Apr. 24, 2023

(65) Prior Publication Data

US 2023/0283964 A1 Sep. 7, 2023

Related U.S. Application Data

(62) Division of application No. 17/184,338, filed on Feb. 24, 2021, now Pat. No. 11,671,763.

(51) Int. Cl.

| | |
|---|---|
| ***H04R 19/01*** | (2006.01) |
| ***B05D 1/00*** | (2006.01) |
| ***H04R 1/04*** | (2006.01) |
| ***H04R 7/04*** | (2006.01) |
| ***H04R 19/04*** | (2006.01) |
| ***H04R 31/00*** | (2006.01) |

(52) U.S. Cl.

CPC ............. *H04R 19/016* (2013.01); *H04R 1/04* (2013.01); *H04R 7/04* (2013.01); *H04R 19/04* (2013.01); *H04R 31/006* (2013.01); *B05D 1/60* (2013.01)

(58) Field of Classification Search

None

See application file for complete search history.

(56) References Cited

U.S. PATENT DOCUMENTS

| | | | |
|---|---|---|---|
| 4,291,244 | A | 9/1981 | Beach et al. |
| 4,291,245 | A | 9/1981 | Nowlin et al. |
| 6,243,474 | B1 | 6/2001 | Tai et al. |
| 7,329,933 | B2 | 2/2008 | Zhe et al. |
| 7,683,323 | B2 | 3/2010 | Kymissis |
| 7,858,975 | B2 | 12/2010 | Kymissis |
| 7,879,446 | B2 | 2/2011 | Liu et al. |
| 8,345,910 | B2 | 1/2013 | Chae et al. |
| 8,531,088 | B2 | 9/2013 | Grosh et al. |
| 8,542,850 | B2 | 9/2013 | Wang et al. |

(Continued)

FOREIGN PATENT DOCUMENTS

| | | | |
|---|---|---|---|
| CN | 105936798 | A | 9/2016 |
| CN | 111269077 | A | 6/2020 |
| WO | 9924141 | A1 | 5/1999 |

OTHER PUBLICATIONS

Sailendra Wadhwani, Parylene Coatings and Applications, PCI Paint & Coatings Industry, Oct. 1, 2006.

(Continued)

*Primary Examiner* — Kenny H Truong

(74) *Attorney, Agent, or Firm* — Banner & Witcoff, Ltd.

(57) ABSTRACT

A backplate assembly for a condenser microphone. The backplate may be coated with a parylene configured to help reduce the flatness deviation of the backplate across the diameter of the backplate. A plurality of openings may extend from the top portion of the backplate to the bottom portion of the backplate.

24 Claims, 7 Drawing Sheets

(56) References Cited

U.S. PATENT DOCUMENTS

| | | | |
|---|---|---|---|
| 9,161,113 B1 | 10/2015 | Fenton et al. | |
| 9,352,959 B1 | 5/2016 | Bulovic et al. | |
| 9,667,173 B1 | 5/2017 | Kappus et al. | |
| 2002/0168076 A1 | 11/2002 | Collins | |
| 2003/0118203 A1 | 6/2003 | Raicevich | |
| 2004/0253760 A1 | 12/2004 | Zhang et al. | |
| 2005/0185811 A1 | 8/2005 | Song | |
| 2005/0254673 A1 | 11/2005 | Hsieh et al. | |
| 2009/0268930 A1 | 10/2009 | Yuasa et al. | |
| 2011/0138902 A1 | 6/2011 | White et al. | |
| 2011/0262740 A1 | 10/2011 | Martin, III et al. | |
| 2012/0230523 A1 | 9/2012 | Ehrlund | |
| 2014/0339657 A1* | 11/2014 | Grosh | H04R 17/00 257/416 |

OTHER PUBLICATIONS

Kiao Dong, Parylene-MEMS technique-based flexible electronics, Science China Information Sciences, Jun. 2018, vol. 61, 10.1007/s11432-018-9430-2, DeepDyve.

Siti Aisyah Zawawi et al., A Review of MEMS Capacitive Microphones, MDPI, May 8, 2020.

Tze-Jung Yao, Parylene for MEMS applications, California Institute of Technology, CaltechThesis.

S. Genter et al., Parylene-C as an Electret Material for Micro Energy Harvesting, Department of Microsystems Engineering (IMTEK), University of Freiburg, Germany, PowerMEMS 2012, Atlanta, GA, USA, Dec. 2-5, 2012.

Masato Edamoto, et al., Electret-Based Energy Harvesting Device With Parylene Flexible Springs, The 4th Asia Pacific Conference on Transducers and Micro/Nano Technologies (APCOT), Jun. 22-25, 2008.

S. Genter, et al., Electret-based Out-Of-Plane Micro Energy Harvester with Parylene-C Serving as the Electret and Spring Material, Department of Microsystems Engineering (IMTEK), University of Freiburg, Germany, ScienceDirect, Procedia Engineering 120 (2015) 341-344.

Hsi-Wen Lo et al., Parylene-based electret power generators, Department of Electrical Engineering, California Institute of Technology, Journal of Micromechanics and Microengineering, Sep. 29, 2008.

Yi Chiu et al., Flexible electret energy harvesters with parylene electret on PDMS substrates, Department of Electrical and Computer Engineering, Journal of Physics: Conference Series 476 012037, PowerMEMS 2013.

Yi Chiu et al., PDMS-based flexible energy harvester with Parylene electret and copper mesh electrodes, Department of Electrical and Computer Engineering, Journal of Micromechanics and Microengineering, Sep. 24, 2015, DeepDyve.

Clara Lagomarsini et al., Outstanding performance of parylene polymers as electrets for energy harvesting and high-temperature applications, Journal of Applied Polymer Science, Nov. 21, 2019.

Meng-Nian Niu et al., Piezoelectric bimorph microphone built on micromachined parylene diaphragm, IEEE Journals & Magazines, vol. 12, Issue 6, Dec. 2003.

William R. Dolbier Jr. et al., Parylene-AF4: a polymer with exceptional dielectric and thermal properties, Science Direct, Journal of Fluorine Chemistry 122 (2003) 97-104, Department of Chemistry, University of Florida, Gainesville, FL.

May 18, 2022—(WO) ISR & WO—App. No. PCT/US2022/070395.

Hsieh Wen H. : "MEMS Thin Film Teflon Electret Condenser Microphones", Jan. 1, 2001 (Jan. 1, 2001), pp. 1-149, XP055918554, California Institute of Technology, Pasadena, California, USA Retrieved from the Internet: URL: https://thesis.library.caltech.edu/3281/1/Hsieh_wh_2001.pdf [retrieved on May 6, 2022] the whole document.

* cited by examiner

PARYLENE ELECTRET CONDENSER MICROPHONE BACKPLATE

CROSS-REFERENCE TO RELATED APPLICATIONS

This application is a divisional of U.S. patent application Ser. No. 17/184,338, filed Feb. 24, 2021, entitled "PARYLENE ELECTRET CONDENSER MICROPHONE BACKPLATE," which is herein incorporated by reference in its entirety.

FIELD

The present disclosure relates generally to microphones, and more particularly to electret condenser microphone assemblies, such as a backplate fabricated with an alternative electret material.

BACKGROUND

Microphones convert sound into an electrical signal through the use of a transducer that includes a diaphragm to convert sound into mechanical motion, which in turn is converted to an electrical signal. Generally, microphones can be categorized by their transducer method (e.g., condenser, dynamic, ribbon, carbon, laser, or microelectromechanical systems (MEMS)). Condenser or capacitance microphones are widely used in the audio, electronics and instrumentation industries. Electret condenser microphones include a flexible diaphragm or membrane and a rigid backplate that may contain one or more openings. The diaphragm or flexible diaphragm can be coated with an electret material.

The working principle of an electret condenser microphone is that the diaphragm acts as one plate of a capacitor and the backplate the other. Vibrations produce changes in the distance between the diaphragm and the backplate. The voltage maintained across the diaphragm and the backplate changes with the vibrations in the air, according to the capacitance equation (C=Q/V), where Q=charge in coulombs, C=capacitance in farads and V=potential difference in volts. This change in voltage is amplified by a FET and the audio signal appears at the output, after a dc-blocking capacitor.

In some cases, the flexible diaphragm is coated with an electret material. In other cases, the rigid backplate (instead of the diaphragm) is coated with an electret material. Raw punched metal backplates can receive a coating of Teflon® or Teflon® variant. The common application method of this electret material onto the metal backplate is by lamination. This lamination process in certain instances can cause warping of the backplate due to the high heat necessary for lamination. In certain examples, during the lamination process, stresses built into the raw punched metal backplates during the hole punching process are relieved, resulting in warping of the backplate.

Maintaining a consistent flatness of the rigid backplate during production can be helpful for maintaining consistent sensitivity of the microphone assembly. Condenser microphone cartridges are often assembled to create an air gap between the diaphragm and backplate between one and two thousandths of an inch. A backplate that is even six to eight ten-thousandths of an inch out of flat can drastically affect the performance of the microphone assembly.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The present disclosure solves many of the aforementioned problems by a microphone assembly comprising a perforated backplate assembly coated with an electret material such as a vapor-deposited polymeric conformal coating material. In one example, the electret material may be a parylene. In contrast to the lamination application method mentioned above, parylene is applied by a heat-less vapor deposition process. The resulting parylene-coated backplates may be very flat, which may help ensure consistent sensitivity of the microphone assembly.

The backplate includes a body, a top and bottom side, and a plurality of perforations extending from the top side of the backplate to the bottom side of the backplate. In one embodiment, the top side of the backplate is coated with a vapor-deposited polymeric conformal coating material such as a parylene. The body of the backplate may be circular, rectangular, or another desirable shape. The body of the backplate may be fabricated from raw punched metal, metallized ceramic, metallized plastic, or a printed circuit board. In another embodiment, a plurality of inner diameters of the plurality of perforations are also coated with parylene.

These as well as other novel advantages, details, embodiments, features and objects of the present disclosure will be apparent to those skilled in the art from following the detailed description of the disclosure, the attached claims and accompanying drawings, listed herein, which are useful in explaining the disclosure.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the disclosure so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives are not intended to imply that the components must be provided in given order, either temporally, spatially, in ranking, or in any other way.

Also, while the terms "front," "back," "side," and the like may be used in this specification to describe various example features and elements, these terms are used herein as a matter of convenience, for example, based on the example orientations shown in the figures and/or the orientations in typical use. Nothing in this specification should be construed as requiring a specific three dimensional or spatial orientation of structures in order to fall within the scope of the claims.

Condenser or capacitance microphones are widely used in the audio, electronics and instrumentation industries. Condenser microphones may be wired or wireless. If wired, these microphones can be connected to a transmitter or receiver via any one of a variety of different cables, including a twisted wire pair, a coaxial cable, or fiber optics. These wired microphones can also connect to a transmitter or receiver using any one of a variety of different connectors, including a LEMO connector, an XLR connector, a TQG connector, a TRS connector, a USB, or RCA connectors. Condenser microphones can also be wireless and connect an audio system through any one of a variety of protocols, including WiMAX, LTE, Bluetooth, Bluetooth Broadcast, GSM, 3G, 4G, 5G, Zigbee, 60 GHz Wi-Fi, Wi-Fi (e.g., compatible with IEEE 802.11a/b/g), or NFC protocols. In this embodiment, a transmitter can be included within or attached to the microphone.

Figure 1:
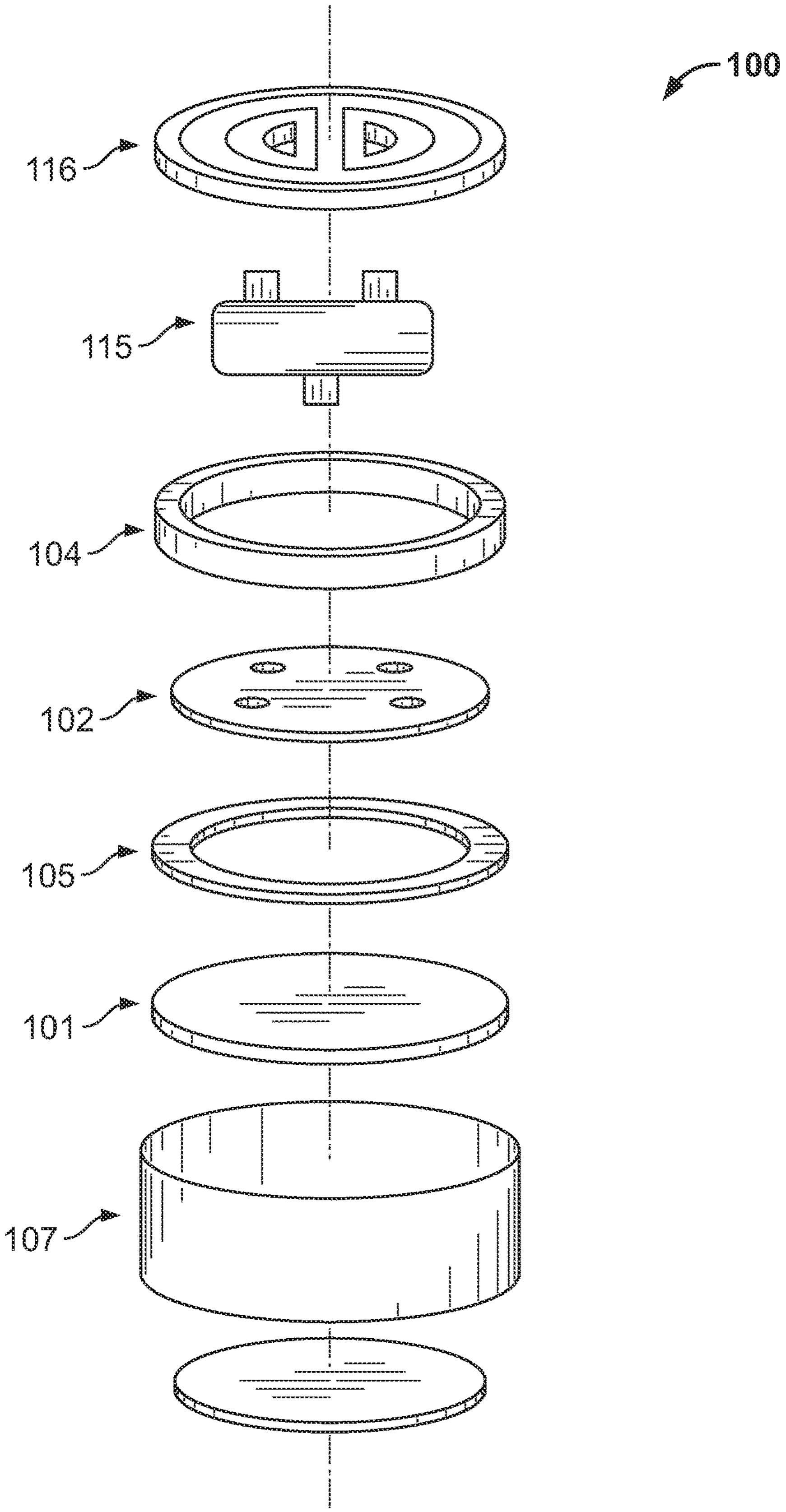
FIG. 1 is a perspective and exploded view of a first example of a microphone condenser assembly made in accordance with the present disclosure.
Figure 2:
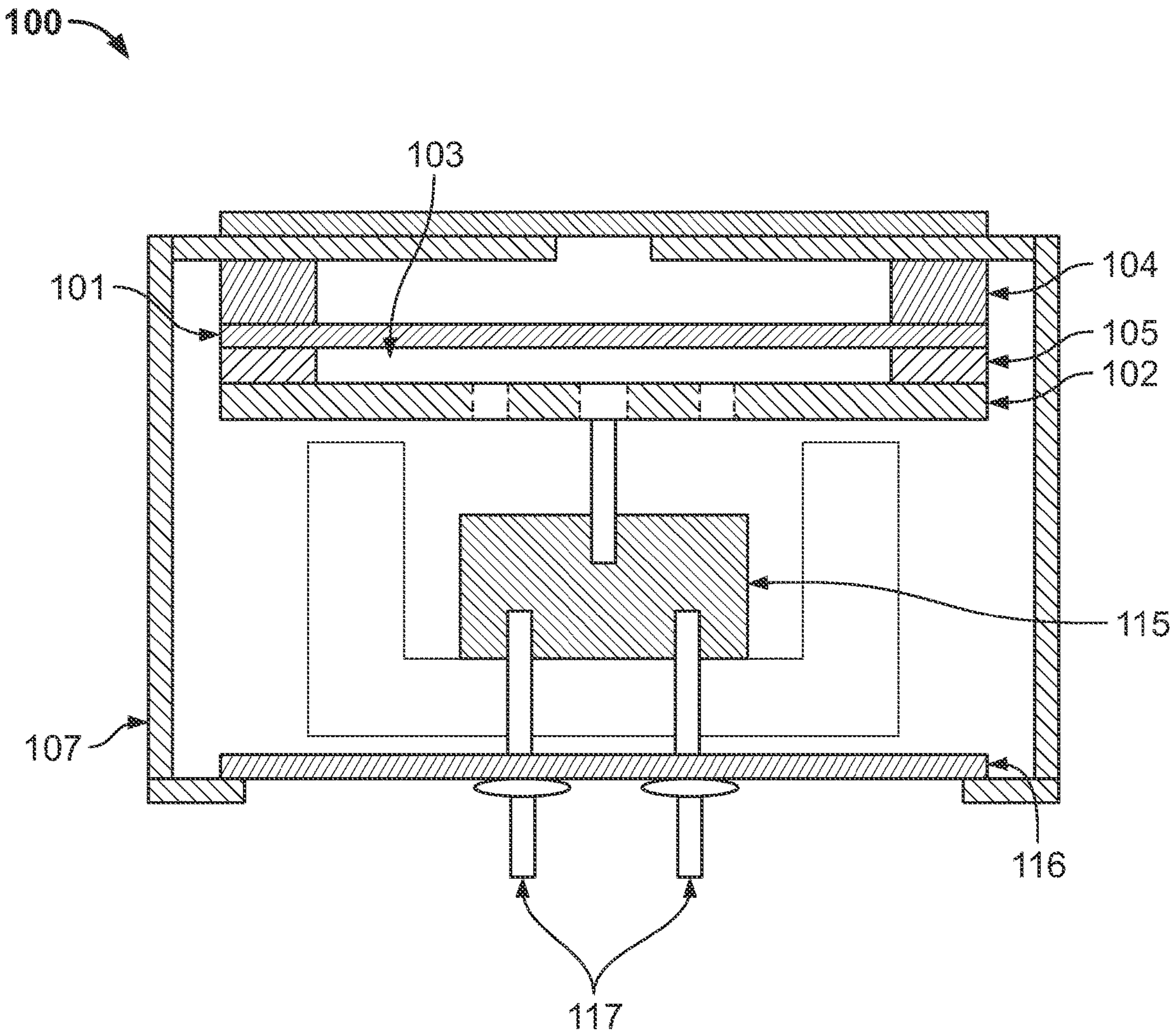
FIG. 2 is a cross-sectional view of a portion of the microphone condenser assembly shown in FIG. 1.

Referring to FIGS. 1 and 2, in one example, the present disclosure includes a microphone assembly 100 which includes a single flexible membrane or diaphragm 101 with a metalized coating that is separated from a backplate 102. A protective grille (not shown) may be mounted above the diaphragm 101 to serve as a protective environmental barrier. The diaphragm 101 serves as a sensing electrode of a capacitive electroacoustic transducer and is made of a known material for constructing microphone diaphragms, such as metal film or metallized polymer film.

The diaphragm 101 and the backplate 102 form a capacitor, also known as a condenser. When a sound wave hits the diaphragm 101, the diaphragm moves, causing a variation in height of the air gap 103 between the diaphragm 101 and the backplate 102. This gap variation results in a change in the capacitance of the condenser formed by the diaphragm 101 and the backplate 102. If a fixed or controlled charge Q is maintained on the capacitor, a voltage will be formed across the capacitor that will then vary proportionally to the change in the height of the air gap 103. This change in voltage is amplified by a transistor 115, which may be coupled to printed circuit board 116. The audio signal appears at the output 117 (shown in FIG. 2). Transistor 115 may be configured as a field effect transistor (FET) or bipolar junction transistor (BJT).

The diaphragm 101 may be stretched over a diaphragm frame 104 and glued or adhesively affixed to the diaphragm frame. The diaphragm frame 104 can maintain tension in the diaphragm 101. The backplate 102 is rigid or fixed. The diaphragm 101 is separated from the backplate 102 by a narrow air gap 103 (shown in FIG. 2) defined by the spacer 105. The backplate 102 is fabricated, for example, from raw punched metal. The spacer 105 is fabricated, for example, from a hard-plastic insulative material to both help prevent the spacer 105 from deforming under pressure and to help prevent current flow between the diaphragm 101 and backplate 102. The spacer may take the form of many shapes, such as a wall or a ridge. The diaphragm 101, backplate 102, and spacer 105 may be coupled to the housing 107. Housing 107 can be made of metal. The housing 107 can also serve as an electrical ground.

A variety of shapes and configurations may be used for the diaphragm 101 and backplate 102. For example, in FIG. 1 the diaphragm frame 104 can be round, and the backplate can also be round. One skilled in the art will appreciate that the diaphragm and backplate could include other shapes depending of the shape of the housing 107 and the other components of the disclosure.

In some cases, the flexible diaphragm may be coated with an electret material. In other cases, the backplate may be coated with an electret material. Teflon® has been used as the electret material for several decades. The common application method of this electret material onto the base metal backplate is by lamination. However, this lamination process can cause warping of the backplate due to the high heat necessary for lamination. Referring again to FIG. 2, air gap 103 may measure 0.0015 inches (while the diaphragm is at rest) in one example. In another example, air gap 103 may measure over 0.0015 inches. As the spacing between the backplate and diaphragm increases, i.e. the height of the air gap increases, the voltage necessary to maintain proper microphone sensitivity must correspondingly increase. Microphone sensitivity refers to a measure of the output voltage of a microphone divided by the magnitude of the air pressure disturbance. For the backplate to warp just a few tenths of a thousandths of an inch can drastically affect the performance of the microphone assembly 100. For instance, Teflon® coated backplates may have, on average, a deviation of approximately 46 percent of the total air gap height. Consequently, these variations in flatness may cause variations in capacitance, and thus sensitivity of the microphone assembly 100. In some instances, the diaphragm may become electrostatically attracted to the backplate and collapse onto the backplate, causing the microphone assembly 100 to fail. Thus, production yields may be inhibited.

In contrast, a polymeric conformal coating material such as a parylene, in one example, can be utilized as an electret material and applied by a heat-less vapor deposition process. Parylene is the generic name for members of a polymer series whose monomers generally include a para-benzenediyl ring (phenyl ring) and 1,2-ethanediyl bridges (aliphatic bridges). The basic member of the series is poly(para-xylylene) (parylene N) and its derivatives may comprise other functional groups in place of certain hydrogen atoms present in the N monomer. FIG. 3*a* depicts the backplate 102 with an electret coating 312. The backplate 102 may be configured to exhibit a flatness deviation of 10 percent of the total air gap height (while the diaphragm is at rest) when measured across the diameter of the backplate body 308. In one example, the backplate 102 with electret coating 312 may be configured to exhibit a flatness deviation of 10 percent or less of the total air gap height (while the diaphragm is at rest) when measured across the diameter of the backplate body 308. In another example, the backplate 102 with electret coating 312 may be configured to exhibit a flatness deviation of between 10 percent and 20 percent of the total air gap height (while the diaphragm is at rest) when measured across the diameter of the backplate body 308. In yet other examples, the backplate 102 with electret coating 312 may be configured to exhibit a flatness deviation of below 35% or below 20% percent of the total air gap height (while the diaphragm is at rest) when measured across the diameter of the backplate body 308. In any of the foregoing examples, the flatness deviation of the backplate may be measured and confirmed using any number of dimensional metrology equipment, including, but not limited to, optical three-dimensional measurement systems, machine vision systems, laser trackers, and optical comparators. Thus, parylene-coated backplates may help to maintain a consistent sensitivity of the microphone assembly 100 during production and mitigate the risk of diaphragm collapse, which in turn may increase production yields.

Figure 3:
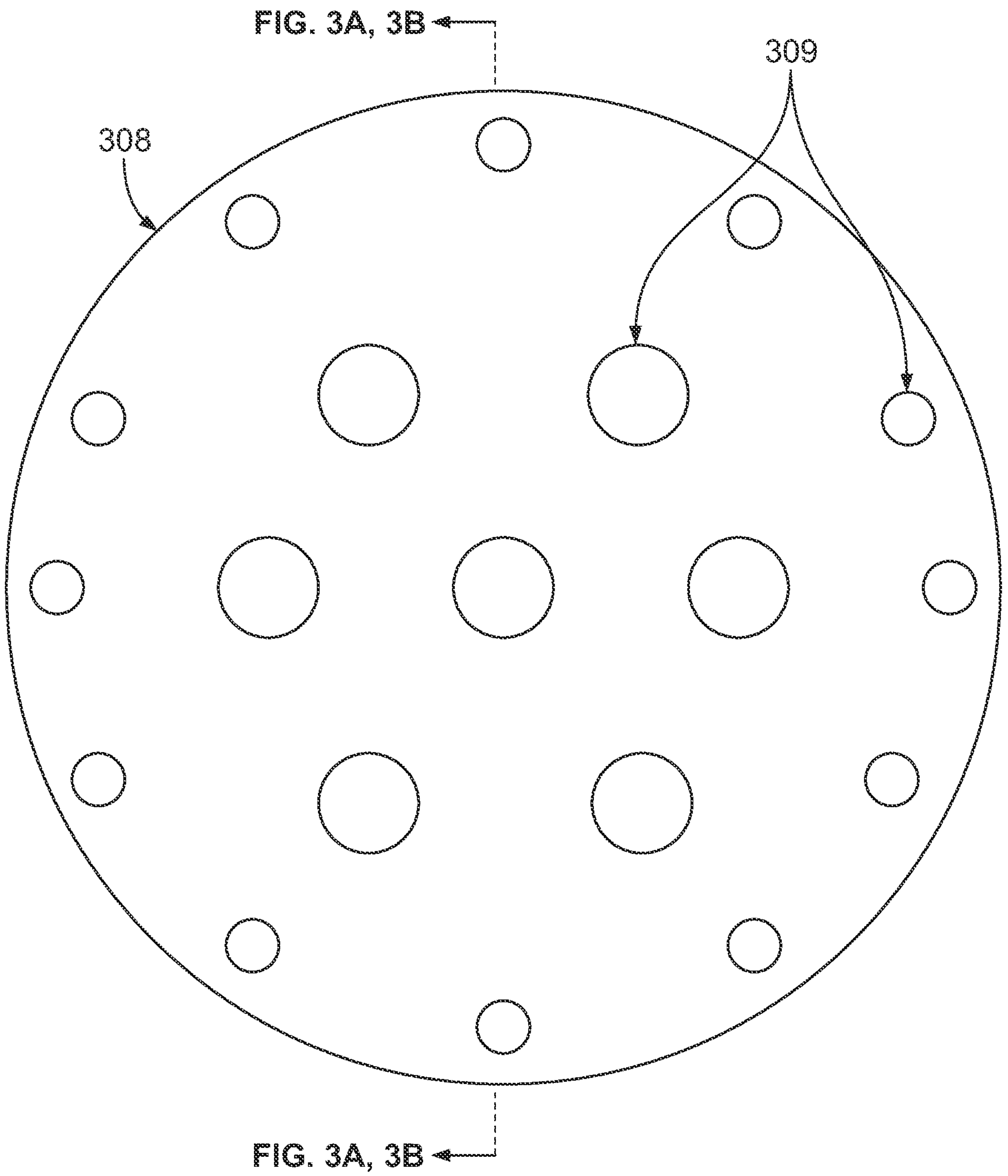
FIG. 3 is a plan view of a first example of a backplate made in accordance with the present disclosure.
Figure 3A:
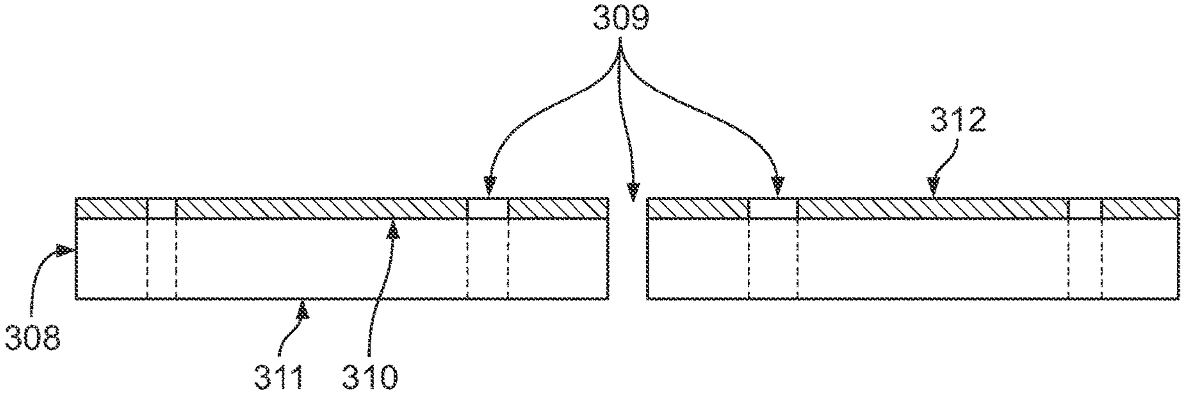
FIG. 3*a* is a cross-sectional view of the first example indicated by line 3*a*/3*b* in FIG. 3.

Referring to FIGS. 3 and 3*a*, the backplate 102 includes a body 308 that is fabricated from raw punched metal. The body 308 may include perforations or holes indicated by arrows 309. These openings allow air to pass from the top side 310 of the backplate to the bottom side 311 of the backplate. A vapor-deposited electret coating 312 may be present on the top side of the backplate body 308.

In one embodiment, the electret coating 312 is 25 μm thick. In other embodiments, the electret coating 312 thickness may be less than 25 μm or more than 25 μm. In one example, the vapor-deposited electret coating can be a bridge-fluorinated derivative of parylene N known as poly (α,α,α'α'-tetrafluoro-p-xylylene)(parylene-AF4). Parylene-AF4 is commercially available as Parylene HT®, a registered trademark of Specialty Coating Systems, Inc., and diX SF, produced by Daisan Kasei Col., Ltd. Parylene-AF4 has a high dielectric strength, low dielectric constant, has an ability to be vapor-deposited uniformly at room temperature, and a high penetrating ability. Yet other parylene derivatives or other carbon-fluorine based polymers, including fluorinated parylenes with fewer or more fluorine-hydrogen replacements than parylene-AF4, may also be utilized as an effective electret material. Other types of polymeric conformal coating materials capable of being vapor-deposited may also be used.

An additional advantage of coating the backplate 102 with electret coating 312 may be that parylene-coated backplates exhibit an improved initial charge capacity before discharge. The initial charge capacity before discharge of parylene-coated backplates is much higher than that of backplates laminated with Teflon®. For example, the backplate 102 with electret coating 312 may exhibit an initial charge capacity before discharge of approximately −1900 volts, whereas an equivalent backplate laminated with Teflon® exhibits an initial charge capacity before discharge of approximately −1000 volts.

Figure 3B:
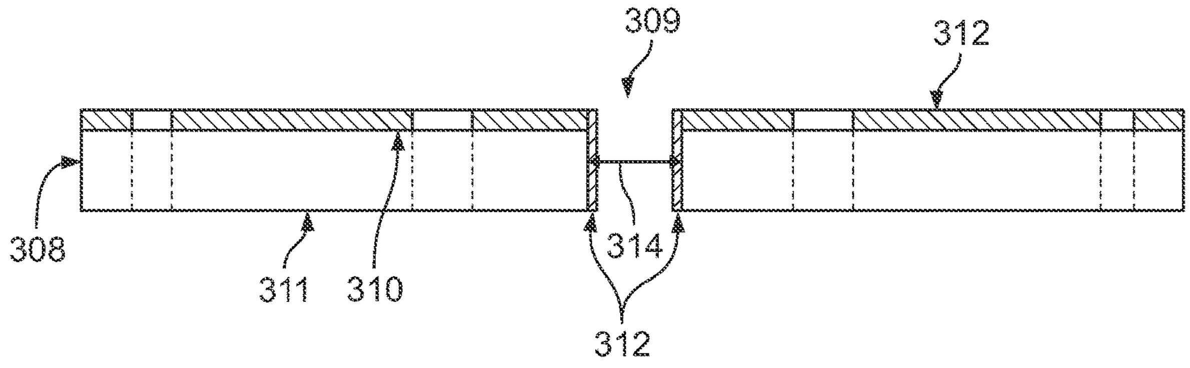
FIG. 3*b* is a cross-sectional view of a second example indicated by line 3*a*/3*b* in FIG. 3.

Referring to FIG. 3*b*, the backplate body 308 may include perforations or holes indicated by 309. These openings allow air to pass from the top side 310 of the backplate to the bottom side 311 of the backplate. A uniform vapor-deposited electret coating 312 may be present on the top side 310 of the backplate body 308. Additionally, an electret coating 312 may be present on the inner diameters 314 of the perforations 309. This is advantageous for several reasons. Significantly, coating the inner diameters 314 of the perforations 309 with an electret may help to ensure a more uniform charge distribution across the body of the backplate. This configuration may also help mitigate problems associated with reading backplate voltage during production and subsequently during the quality control phase, resulting in increased manufacturing and quality control testing efficiencies. In another example, the perforations 309 may be masked so as to prevent the inner diameters 314 from being coated with electret coating 312.

As would be appreciated by one of ordinary skill in the art, the location, number and size of perforations or holes affects the audio characteristics, such as frequency response and sensitivity, of the microphone. Any number of variations of hole sizes and arrangements may also benefit from a vapor-deposited electret coating 312 of the inner diameters 314. For example, in instances where the backplate diameter measures from tens of millimeters to several millimeters, the backplate holes become correspondingly smaller. For example, a backplate with a diameter of 0.120 inches or less may have holes that measure 0.020 inches or less. Current processes configured to shear a Teflon® film layer along the edges of the perforations may not substantially clear backplate holes with diameters less than 0.020 inches. An exemplary process may include a 0.001-inch stainless steel shim that may be placed in a nest with a urethane plug underneath. The backplate may be placed over the shim, with the Teflon®-laminate side facing the shim. A press may push the backplate into the shim at high pressure, at which point the urethane plug liquidizes and may exert a force onto the shim. As the urethane plug exerts a conformal pressure behind the shim, it may cause the shim to cut into the sharp edges of the backplate, trimming excess Teflon®.

The aforementioned process may be ill-suited to clear holes with diameters less than 0.020 inches. As a result, airflow may be restricted through the backplate holes which may cause the microphone capsule to fail. Conversely, the need to shear a layer of conformal material from the holes may be obviated when using a vapor-deposited polymeric conformal coating, such as a parylene, because it may be finely and uniformly applied in a vapor phase to a backplate. Thus, it may be possible to fabricate smaller condenser electret microphone assemblies for a variety of applications. Additionally, using a vapor-deposited polymeric conformal coating, such as a parylene, as an electret material instead of Teflon® may simplify the backplate manufacturing process. Specifically, the aforementioned process may require the backplates to be manufactured with sharp edges around the backplate holes to allow the shim to shear the excess Teflon®. This limitation may be avoided by using a vapor-deposited polymeric conformal coating, such as a parylene, and may consequently simplify the backplate manufacturing process and/or allow for alternative backplate manufacturing processes.

Figure 4:
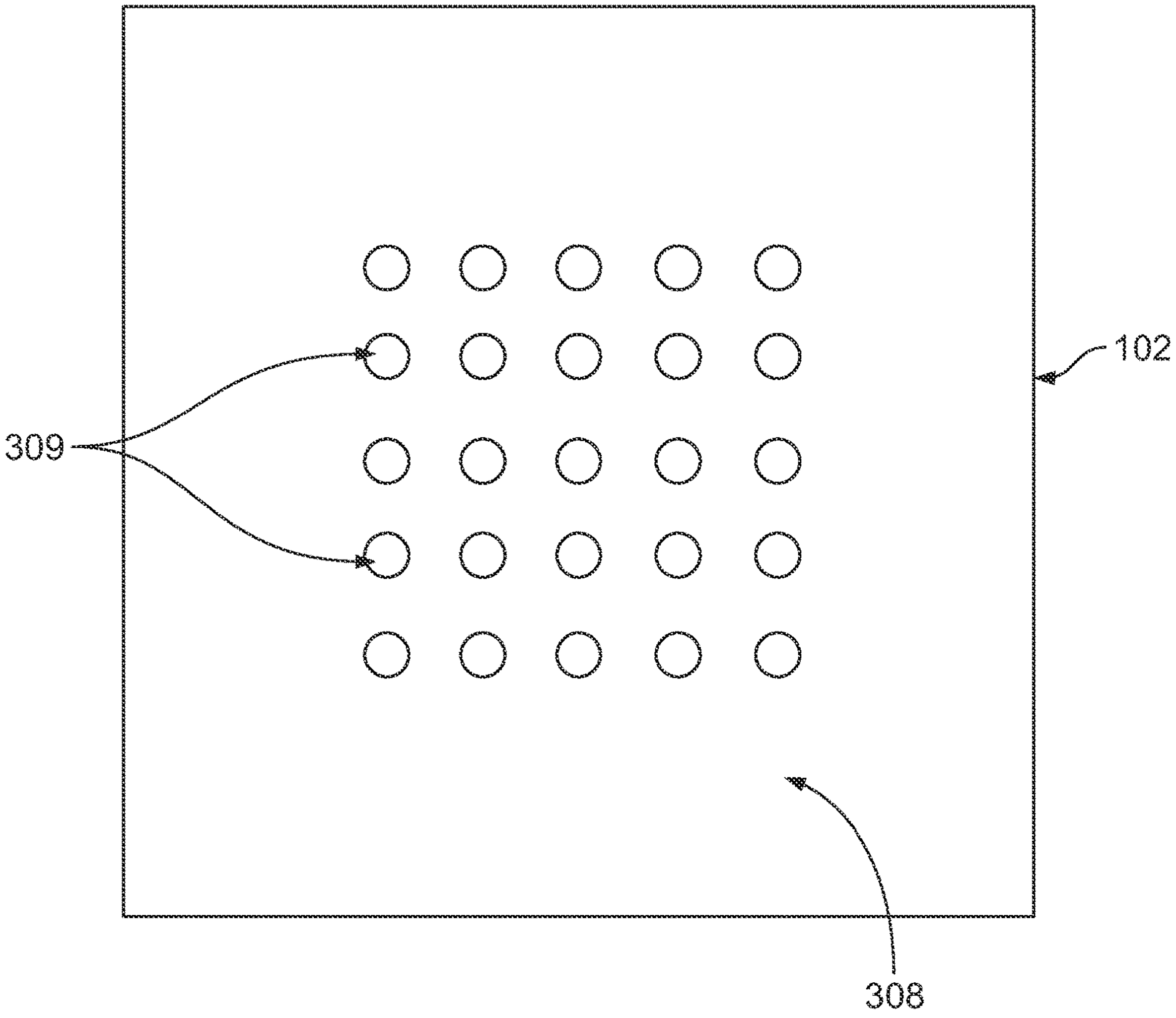
FIG. 4 is a plan view of a third example of a backplate made in accordance with the present disclosure.

An alternative embodiment of the disclosure is made possible by the heat-less vapor deposition process. Unlike traditional lamination methods which require high heat, the vapor deposition coating process is performed in a low heat environment. Thus, heat-sensitive materials and components can be utilized for fabrication of the backplate assembly. This includes alternative raw backplate materials such as metalized plastic, metalized ceramic, and printed circuit boards, among others. In this embodiment, referring again to FIGS. 3 and 4, body 308 of the backplate 102 is fabricated from a printed circuit board. An electret coating 312 uniformly coats the top side 310 of the backplate 102. The printed circuit board may contain amplification circuitry such as field-effect transistors or bipolar junction transistors.

Another advantage of utilizing vapor-deposited polymeric conformal coatings such as a parylene, as an electret material are the resulting manufacturing efficiencies associated with the vapor deposition process. Throughput is significantly limited with traditional lamination processes. In some cases, current lamination processes only laminate tens of backplates at a time. Conversely, a vapor deposition process will increase throughput at least tenfold. For example, large deposition chambers could fit many hundreds or thousands of parts, allowing hundreds of backplates to be coated with parylene at once.

Figure 5:
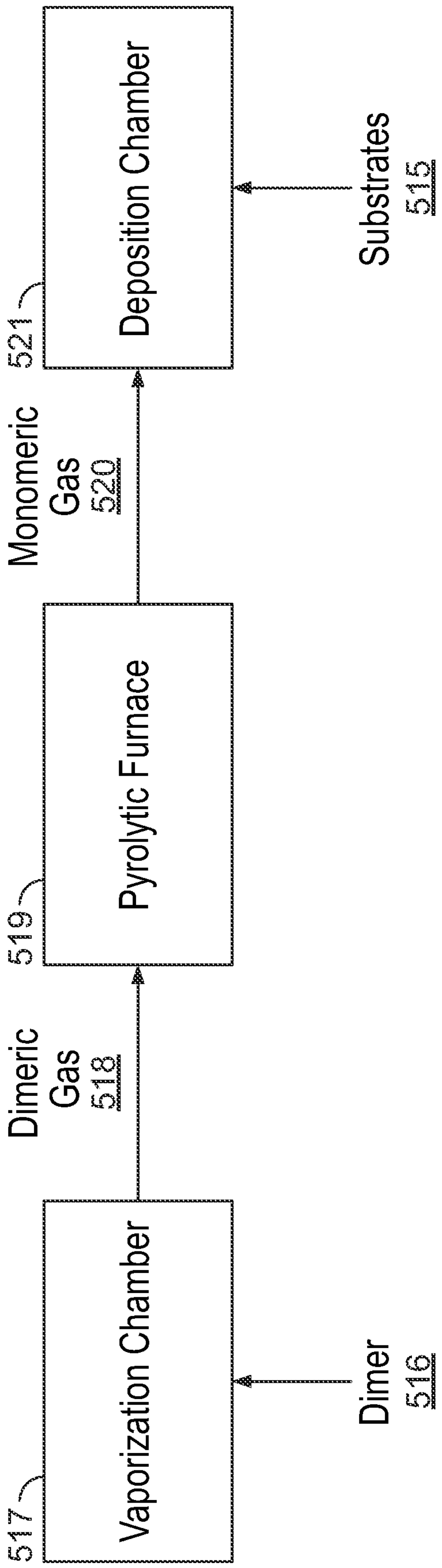
FIG. 5 illustrates a vapor-deposition process.

Referring to FIG. 5, substrates 515 are placed in deposition chamber 521 to be coated. A wide variety of substrates can be used, including metal, plastic, metalized plastic, metalized ceramic, elastomer, silicon, and silicon-based derivatives. Dimer 516 is then placed into the vaporization chamber 517. A number of different varieties of dimer may be utilized. The dimer 516 is vaporized into a dimeric gas 518. Dimeric gas 518 enters the pyrolytic furnace 519, where the dimeric gas 518 is heated and transformed into monomeric gas 520. Monomeric gas 520 enters the ambient temperature deposition chamber 521 and polymerizes the exposed surfaces of the substrates 515. In one example, no additional curing steps are needed once the exposed surfaces of the substrates 515 are coated with parylene. The parylene coating can range in thickness from 1 micron to hundreds of microns.

A backplate assembly for a condenser microphone may comprise a body which may comprise a diameter a top side and a bottom side. A coating of a vapor-deposited parylene electret material may coat the top side of the body. The coating of vapor-deposited parylene electret material may be configured to help to ensure a uniform charge distribution across the body of the backplate assembly. The body may have a flatness deviation across the diameter of the body measuring 20 percent or less of the height of an air gap intermediate a diaphragm and the backplate assembly. The coating of vapor-deposited parylene electret material may comprise parylene-AF4. The coating of vapor-deposited parylene electret material may comprise parylene-VT4. The backplate may exhibit a maximum initial charge capacity of −1900 volts. The body of the backplate may comprise a printed circuit board. The body of the backplate may comprise a metalized plastic. The body of the backplate may comprise a metalized ceramic. The backplate assembly may further comprise a plurality of perforations that extend from the top side of the body through the bottom side of the body. The coating of vapor-deposited parylene electret material may coat a plurality of inside diameters of the plurality of perforations. The coating of vapor-deposited parylene electret material may comprise parylene-VT4.

A backplate assembly for a condenser microphone may include a body that may include a diameter and a top side. A coating of vapor-deposited parylene electret material may coat the top side of the body. The body may have a flatness deviation across the diameter of the body that measures 10 percent or less of the height of an air gap that may be intermediate a diaphragm and the perforated backplate assembly. The coating of vapor-deposited parylene electret material may comprise parylene-AF4. The coating of vapor-deposited parylene electret material comprises parylene-VT4. The body of the backplate may comprise a printed circuit board. The body of the backplate may comprise a metalized plastic. The body of the backplate may comprise a metalized ceramic. The backplate assembly may comprise a plurality of perforations that extend from the top side of the body through the bottom side of the body. The coating of vapor-deposited parylene electret material may coat a plurality of inside diameters of the plurality of perforations. The coating of vapor-deposited parylene electret material may comprise parylene-VT4.

In the foregoing specification, the present disclosure has been described with reference to specific exemplary embodiments thereof. Although the disclosure has been described in terms of a preferred embodiment, those skilled in the art will recognize that various modifications, embodiments or variations of the disclosure can be practiced within the spirit and scope of the disclosure as set forth in the appended claims. The specification and drawings are, therefore, to be regarded in an illustrated rather than restrictive sense. Accordingly, it is not intended that the disclosure be limited except as may be necessary in view of the appended claims.

The invention claimed is:

1. A backplate assembly for a condenser microphone comprising:
- a body comprising:
  - a diameter;
  - a top side; and
  - a bottom side;
- wherein a coating of a vapor-deposited parylene electret material coats the top side of the body; and
- wherein the coating of vapor-deposited parylene electret material is configured to help to ensure a uniform charge distribution across the body of the backplate assembly.

2. The backplate assembly according to claim 1, wherein the body has a flatness deviation across the diameter of the body measuring 20 percent or less of a height of an air gap intermediate a diaphragm and the backplate assembly.

3. The backplate assembly according to claim 1, wherein the coating of vapor-deposited parylene electret material comprises parylene-AF4.

4. The backplate assembly according to claim 1, wherein the coating of vapor-deposited parylene electret material comprises parylene-VT4.

5. The backplate assembly according to claim 1, wherein the backplate assembly exhibits a maximum initial charge capacity of −1900 volts.

6. The backplate assembly according to claim 1, wherein the body of the backplate assembly comprises a printed circuit board.

7. The backplate assembly according to claim 1, wherein the body of the backplate assembly comprises a metalized plastic.

8. The backplate assembly according to claim 1, wherein the body of the backplate assembly comprises a metalized ceramic.

9. The backplate assembly according to claim 1, further comprising a plurality of perforations that extend from the top side of the body through the bottom side of the body.

10. The backplate assembly according to claim 9, wherein the coating of vapor-deposited parylene electret material coats a plurality of inside diameters of the plurality of perforations.

11. The backplate assembly according to claim 10, wherein the coating of vapor-deposited parylene electret material comprises parylene-VT4.

12. The backplate assembly according to claim 1, wherein the vapor-deposited parylene electret material comprises a non-fluorinated parylene.

13. The backplate assembly according to claim 12, wherein the non-fluorinated parylene comprises at least one of: Parylene N, Parylene C, or Parylene D.

14. A backplate assembly for a condenser microphone comprising:
- a body comprising:
  - a diameter; and
  - a top side;

wherein a coating of vapor-deposited parylene electret material coats the top side of the body; and wherein the body has a flatness deviation across the diameter of the body measuring 10 percent or less of a height of an air gap intermediate a diaphragm and the backplate assembly.

15. The backplate assembly according to claim 14, wherein the coating of vapor-deposited parylene electret material comprises parylene-AF4.

16. The backplate assembly according to claim 14, wherein the coating of vapor-deposited parylene electret material comprises parylene-VT4.

17. The backplate assembly according to claim 14, wherein the body of the backplate assembly comprises a printed circuit board.

18. The backplate assembly according to claim 14, wherein the body of the backplate assembly comprises a metalized plastic.

19. The backplate assembly according to claim 14, wherein the body of the backplate assembly comprises a metalized ceramic.

20. The backplate assembly according to claim 14, further comprising a plurality of perforations that extend from the top side of the body through a bottom side of the body.

21. The backplate assembly according to claim 20, wherein the coating of vapor-deposited parylene electret material coats a plurality of inside diameters of the plurality of perforations.

22. The backplate assembly according to claim 21, wherein the coating of vapor-deposited parylene electret material comprises parylene-VT4.

23. The backplate assembly according to claim 14, wherein the vapor-deposited parylene electret material comprises a non-fluorinated parylene.

24. The backplate assembly according to claim 23, wherein the non-fluorinated parylene comprises at least one of: Parylene N, Parylene C, or Parylene D.

* * * * *